Figure 1:
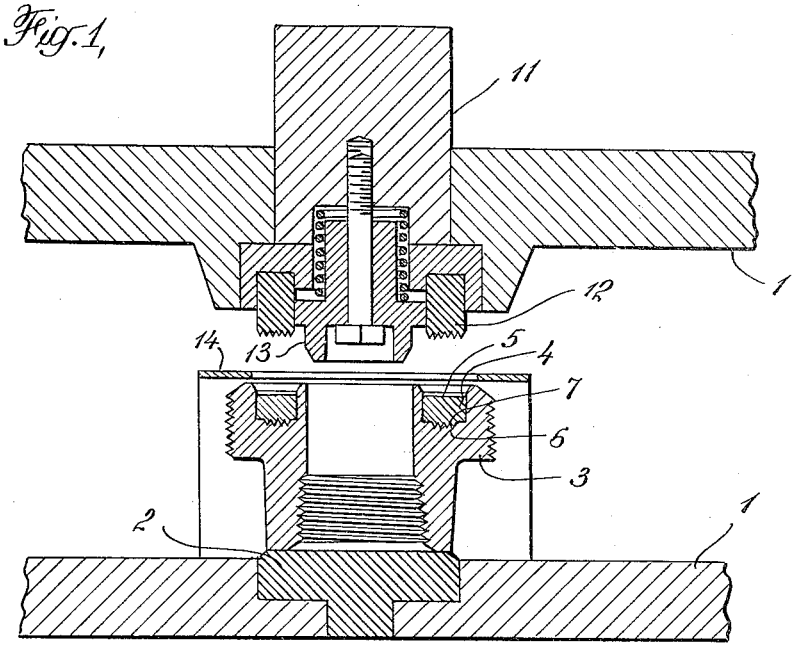

Sept. 27, 1932.  S. N. SMITH ET AL  1,880,115

METHOD FOR MAKING PIPE COUPLINGS

Filed July 12, 1930

INVENTOR
Samuel N. Smith &
James F. Bennies
BY
Pennie, Davis, Marvin & Edmonds
his ATTORNEYS Patented Sept. 27, 1932

1,880,115

UNITED STATES PATENT OFFICE

SAMUEL N. SMITH AND JAMES F. BEMIES, OF NEW YORK, N. Y., ASSIGNORS TO UNITED STATES UNION CORPORATION, A CORPORATION OF DELAWARE

METHOD FOR MAKING PIPE COUPLINGS

Application filed July 12, 1930. Serial No. 467,417.

This invention relates to a method for making pipe couplings.

The coupling to which the present invention relates employs a metal gasket interposed between two abutting socket members, one of these being provided with an annular channel in which the gasket is received, and the other with an annular rib designed to enter the channel and bear against the gasket. A coupling nut, or its equivalent draws the two sockets together and holds them in coupling relationship.

In order to prevent leakage either across or behind the gasket the face of the rib and the bottom of the channel are serrated with a plurality of alternating grooves and ridges, wedge shaped in cross section. With a soft metal gasket, such as one made of lead, these serrations would bite into the metal under the pressure of the coupling nut and find their own seats. The use of soft metal gaskets is not feasible however under conditions of high presure and temperature and the coupling to which this invention relates is intended for high pressure, high temperature use. For this use a hard metal gasket is employed, one having a yield point only slightly less than that of the socket members themselves. The socket members are usually made of malleable iron or steel forgings and the gasket of an alloy of 50% lead, 50% copper, or of bronze. Such a gasket although yielding slightly to the coupling pressure in order to make a tight joint cannot be so deformed by that pressure that the serrations in the sockets form their own seats, as they can with a lead gasket. The corresponding grooves and ridges which form the seats for the serrations in the channel and on the rib of the socket must be preformed. The present invention has to do with the preforming of these serrations and the mounting of the gasket within its channel in the female member of the coupling.

The method of the present invention is briefly as follows: First, the channel in the female member of the coupling is formed and the serrations made in the bottom of it. Then the gasket is inserted. This gasket is cut from a cylinder of the proper metal. First the end of the cylinder is cut to provide centrally disposed serrations corresponding to the serrations in the bottom of the channel and then an annular section cut from the cylinder to form a gasket blank. This gasket in its unfinished condition is dropped within the channel with its serrated face innermost, the grooves and ridges on the gasket interfitting with the corresponding grooves and ridges in the bottom of the channel. The lower face of the gasket is also provided with upwardly or outwardly sloping sections beyond the serrations providing, in effect, a convex face at this stage in the operation. The gasket fits loosely within the channel with a substantial clearance on either side.

The socket member with the gasket positioned as just described is then placed within a press and subjected to the action of an annular expanding and forming die, the operative face of which is likewise serrated. This die performs two functions—it expands the gasket within the channel making a tight and permanent fit, and also forms a series of grooves and ridges in the upper face of the gasket which will interfit with corresponding grooves and ridges on the face of the rib on the other socket member. By making the bottom face of the gasket convex any air which might otherwise be entrapped between the base of the channel and the gasket is extruded as the pressure of the expanding and forming die is applied, and passes out between the gasket and the side walls of the channel.

Figure 2:
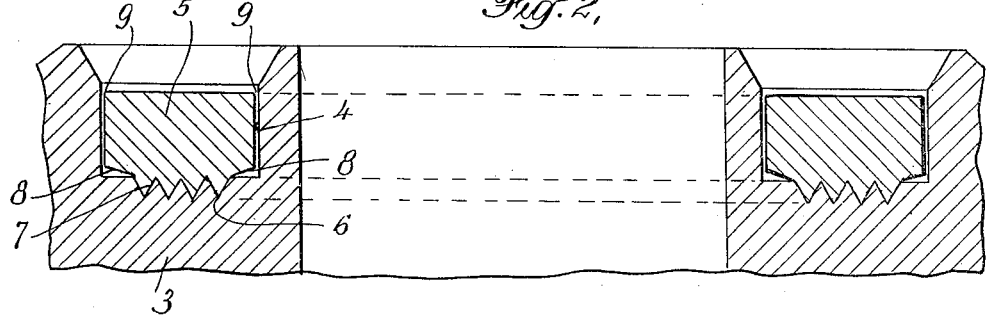

The accompanying drawing will make the invention clear. In this drawing, Figure 1 is a vertical section through the press, forming die and socket member with the parts in readiness for the expanding and forming operation; Figure 2 is an enlarged section through the gasket and channel prior to the expanding and forming operation, and Figure 3 is a view similar to Figure 2 showing the parts after the expanding and forming operation.

As illustrated in this drawing the press 1 is provided with a work-supporting anvil 2 on which is mounted the female socket member 3 provided with an annular channel 4 in which the partly formed gasket 5 is loosely positioned. The bottom of the channel 4 has been provided with alternating grooves and ridges 6 which receive corresponding ridges and grooves 7 on the lower face of the gasket. As illustrated more clearly in Figure 2, the bottom of the gasket slopes upwardly at 8 away from the bottom of the channel and the gasket is sufficiently narrower than the channel to leave clearances 9 between the gasket and the side walls of the channel. Carried at the lower end of a movable shank 11 connected to the movable part of the press is an annular expanding and forming die 12 mounted directly above the channel in the socket. The press is provided with the usual stripping members 13 and 14.

Figure 3:
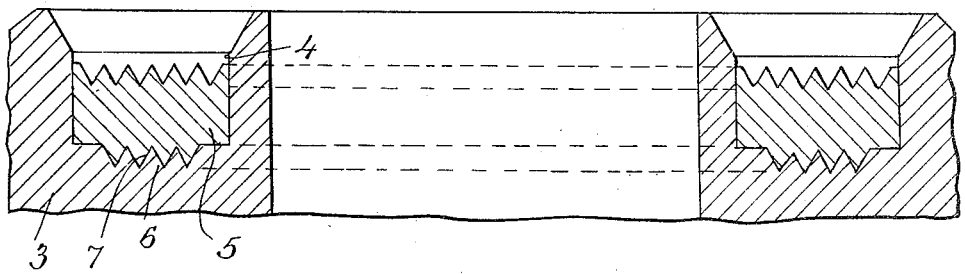

In operation the shank descends forcing the expanding and forming die into contact with the gasket, the pressure being sufficient to cause the serrations in the die to press into the flat upper face of the gasket while at the same time the gasket is expanded within the channel, the position of the parts, after the pressing operation, being illustrated in Figure 3.

The pressure of the die forces the ridges 7 on the lower face of the gasket into intimate contact with the corresponding grooves in the bottom of the channel. It also flattens out the sloping surfaces of the gasket at 8 forcing any entrapped air out through the clearances 9 which are thereafter closed by the continued downward pressure of the die.

We claim:

1. The method of making the female member of a pipe coupling which comprises forming an annular channel in the face of the socket having serrations in its bottom, forming an annular gasket with corresponding serrations on one face, placing the gasket within the channel with the serrations in registry, the gasket making a relatively loose fit with the side walls of the channel, and then expanding the gasket within the channel under pressure and simultaneously forming serrations in the outer face of the gasket.

2. The method of mounting a metal gasket within an annular channel formed in the female member of a pipe coupling which comprises forming the gasket with a convex face, placing the gasket in the channel with the convex face innermost, the gasket making a relatively loose fit with the side walls of the channel, and subjecting the gasket to pressure sufficient to expand it within the channel, the air between the gasket and the bottom of the channel being forced out along the side walls as the gasket is flattened.

3. A metal gasket blank for use in connection with pipe couplings, annular in form, having centrally disposed serrations on one face and outwardly sloping surfaces beyond the serrations extending to the inner and outer circumferences of the blank.

In testimony whereof we affix our signatures.

SAMUEL N. SMITH.
JAMES F. BEMIES.